July 29, 1952 R. W. WILKINS 2,605,065
NET-SUIT, OR COMBINED G-SUIT, PARACHUTE, SAFETY
AND CRASH HARNESS
Filed May 13, 1949 2 SHEETS—SHEET 1
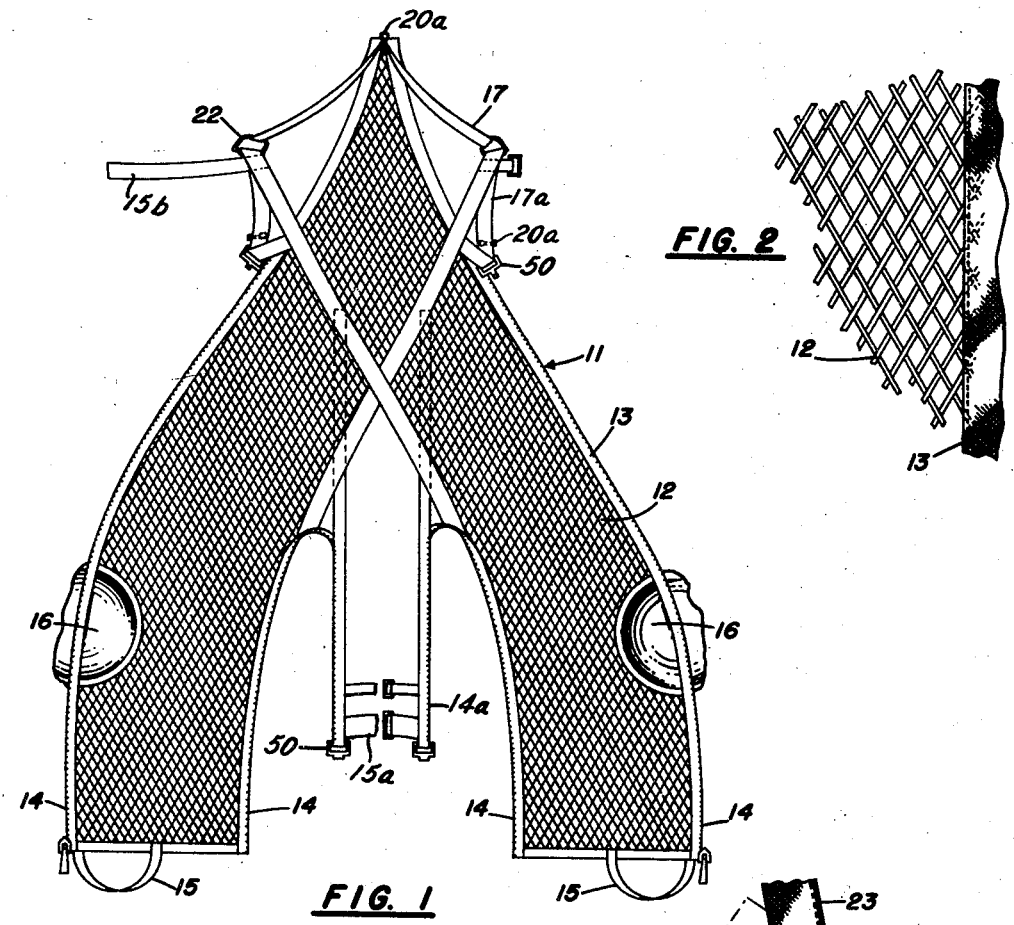
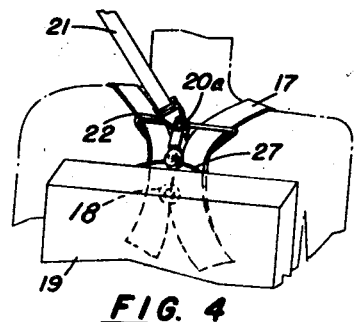
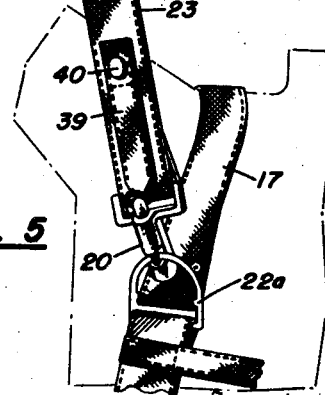
ROBERT W. WILKINS

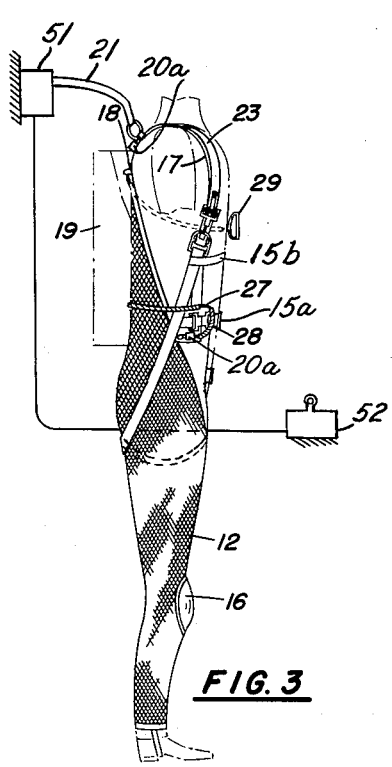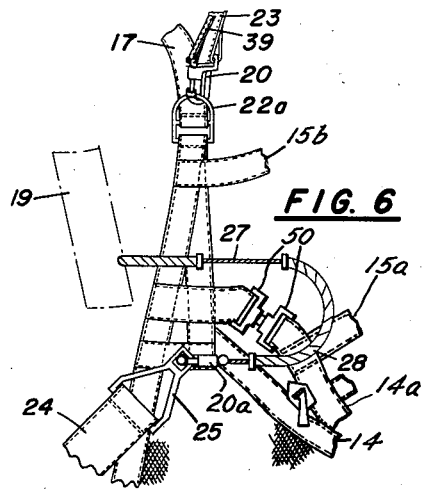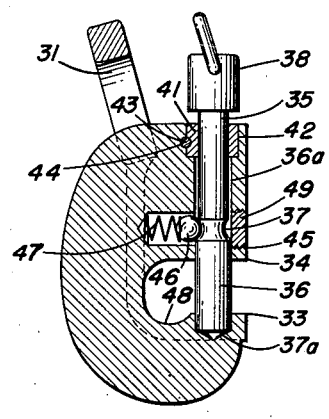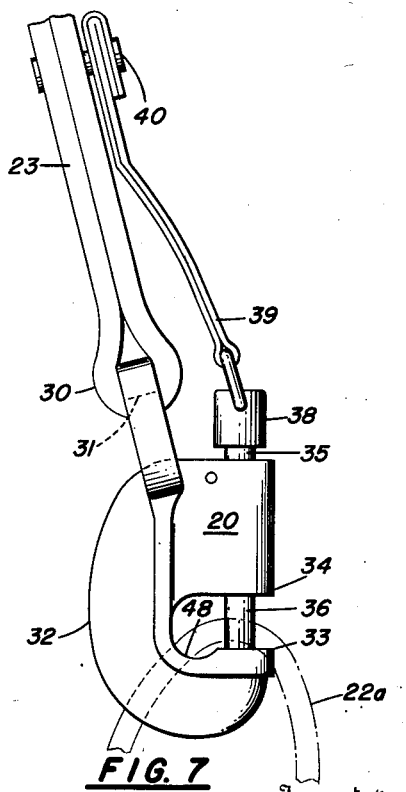

Patented July 29, 1952

2,605,065

UNITED STATES PATENT OFFICE 2,605,065

NET-SUIT, OR COMBINED G-SUIT, PARACHUTE, SAFETY AND CRASH HARNESS

Robert W. Wilkins, Newburyport, Mass., assignor to the United States of America as represented by the Secretary of the Navy Application May 13, 1949, Serial No. 92,972

3 Claims. (Cl. 244—122)

This invention relates generally to aviator's suits and specifically to a suit designed to reduce the effects of gravity acceleration and to lower the risk of injury during crashes and forced landings.

In operation of present day aircraft at elevated speeds, aviators are continually subjected to "G" forces, due to pull-outs in dives and other high speed maneuvers. Furthermore, in some such maneuvers, near-crash effects or buffeting of the aviator in the cockpit present a serious hazard.

Conventional anti-G equipment includes bladders, air valves and air supply and is bulky, complicated and of considerable weight. In some aircraft the problems of cooling the cockpit or emergency ejection of the aviator complicate the use of the inflatable bladder type of anti-G equipment.

In the present invention, an object is to provide an anti-G suit in which there is no inflatable bladder or other equipment dependent on air pressure, valves or the like. The suit of the present invention selectively applies pressure to the limbs and torso of the aviator to minimize the effects of sudden gravity accelerations and other "G" forces.

A further object of the invention is to provide a suit combining the anti-G characteristics with a suit which has connections to the aircraft's safety and anti-crash equipment.

A further object of the invention is to combine the anti-G and anti-crash features in a suit which incorporates the parachute harness therein.

Other objects and advantages of the invention will hereinafter become more fully apparent from the following description of the annexed drawings, which illustrate a preferred embodiment, and wherein:

Fig. 1 is a plan view of the suit.

Fig. 2 is an enlarged plan view of the particular mesh of the suit.

Fig. 3 is a side view of the suit on an aviator showing the parachute pack in dotted outline.

Fig. 4 is a view of a portion of the harness showing connections to the anti-crash reel.

Fig. 5 is a view of a portion of the harness showing connections to the parachute risers.

Fig. 6 shows a portion of the harness and connections to the aircraft's safety belt.

Fig. 7 is a plan view of the quick-release snap shown in Figs. 5 and 6; and

Fig. 8 is a view in section of the quick-release snap.

Referring now to the drawings, wherein like reference characters designate like or corresponding parts throughout the several views, there is shown in Fig. 1 (which illustrates a preferred embodiment) an aviator's suit 11 constructed of diagonally meshed fabric 12 bound by fabric tapes 13 and having: conventional zipper closures 14; instep straps 15; and fabric pockets 16 here shown as a loosely bagged section of cloth somewhat hemi-spherical in shape gathered and sewed along about one-half or slightly more of its periphery to the mesh 12 and for the rest of its periphery gathered and sewed to the thicker fabric of the zipper closure 14, the latter, in Fig. 1, remaining in substantially a straight line, the fabric pocket 16 covering the knee-cap of the aviator when the suit is worn. A harness 17 is shown attached to the tapes 13.

In Fig. 2, the meshed fabric 12 is shown in greater detail, and is diagonal so as to resemble the familiar Japanese finger toy which contracts in diameter as its length is increased.

Fig. 3 shows the suit in place on an aviator and a conventional cone and grommet 18 is shown attached to the harness 17 and to the conventional parachute pack 19 here shown only in dotted outline. Above the cone and grommet connection 18 on the harness 17 is a quick-release snap 20a, shown in Fig. 4, to which is attached D-ring 22 of conventional design secured to one end of tape 21, the other end of which is connected to the operating cable of an anti-crash reel 51 such as is shown in the patent Nordmark, No. 2,434,119, issued January 6, 1948. This anti-crash reel automatically prevents extension of its operating cable and the forward movement of the pilot's shoulders when used with this invention after the onset of a force of two G or less, either in crashes or during dive pull-outs. A latch mechanism 52, available to the pilot controls the release of the anti-crash reel, allowing the pilot normal freedom of movement in his seat.

In Fig. 5, the same quick-release snap 20 is shown attached to the two parachute tapes or risers 23, also of conventional design, engaging D-rings 22a secured in harness 17.

In Fig. 6, the quick-release snap 20a is shown secured by rivets or other means to side straps 17a and releasably hooked into the ring end 25 of safety belt 24, with the sliding bolt 35 secured to the pull-cable 27. In Figs. 3 and 4, pull cables 27 are shown connected to the quick-release snaps 20a on harness 17 and side straps 17a and are looped to form handle 28 within reach of the aviator's right hand, and conventional handle 29 of the parachute release cord or cable is in the usual position on the left side and near the heart, as shown in Fig. 6. Pull cables 27 operate in flexible conduits in the conventional manner and are so arranged in this invention as to release the quick-release snaps 20a from the tape 21 and the safety belt 24 on each side of the pilot with one movement of handle 28.

In Figs. 7 and 8 the construction of the quick-release snap 20 is shown in detail. A portion 30 of the riser 23 is suitably doubled through the eye 31 of the snap, and C-shaped hook member 32 has a lower lip 33 and upper portion 34 with sliding bolt 35 traversing aligned holes 36a and 37a in each thereof. Sliding bolt 35 has enlarged end 36, detent groove 37, and bail cap 38 to which is attached pull tape 39 secured to riser 23 by removable snap fastener 40, of conventional design. Bushing 41, set into enlarged hole 42 at the end of hole 36a is secured therein by pin 43 traversing hole 44 in the upper portion 34 of the quick-release snap. A second hole 45 in the upper portion 34, traverses the hole 36a at right angles and movably positioned therein is detent ball 46 biased by spring 47.

Lower lip 33 of the quick-release snap has an arcuate depression 48 to engage the D-ring 22a (shown in dotted line in Fig. 7) in such a manner as to relieve sliding bolt 35 of any pressure or stress in normal operation. Plug 49 in the face of the upper portion 34 retains the detent ball 46 in operative condition and completes the construction of the quick-release snap. Quick-release snap 29a is of the same construction with the exception that bail-cap 38 connects to the pull-cable 27 and the member 32 is riveted or otherwise attached to the harness 17 or side straps 17a without eye 31.

In operation, the suit is worn by the aviator in a conventional manner, the zippers serving to secure the suit around the lower limbs and conventional fastenings (not illustrated) secure the tapes around the hips and through the crotch, each tape joined to the mesh in such a manner as to compress the limbs upon pulling of the tapes. This serves as an anti-G suit, by the aviator rising slightly in his seat and manually locking the anti-crash reel which thereby suspends him in the suit, applying anti-G constrictions to the limbs and torso proportional to his weight (G). Thus, without the use of bladders or other inflation apparatus, but merely by the arrangement of the mesh on the bias, the weight of the aviator in the suit under acceleration of the plane would provide him with protection against that acceleration (G). To release, the aviator shifts upwardly again against the anti-crash reel which unlocks in the known manner.

In other operations, such as passenger personnel on transport aircraft, the anti-G characteristics of the suit are valuable in alleviating crash dangers. Personnel free to move about a transport in cases of expected crashes or landing can lie prone with the tapes of the suit secured to the aircraft so as to apply forces to the mesh of the suit in the direction opposite to the crash forces, taking some of the strain of the crash on the fabric, and applying bodily compression at the same time by constricting action of the mesh as arranged on the bias. In addition, the wide body coverage of the suit would provide wide distribution of the force incident to the crash reducing the danger of injury by the application of the force over small areas.

Further possibilities for use of the suit are seen in pilot ejection from super-speed aircraft, the mesh applying bodily compression as well as wide distribution of the force as the body is ejected upwardly by an injection apparatus. It has been found too, that pilot seat fatigue is relieved in great part by the ability of the aviator to wholly or partially suspend himself above the seat on the inertia-reel or anti-crash reel.

It should be understood that the foregoing disclosure relates to only a preferred embodiment of the invention and that numerous modifications or alterations may be made therein without departing from the spirit and the scope of the invention as set forth in the appended claims.

What is claimed is:

1. In combination with pilot movement restraining means in an aircraft including a safety belt and an anti-crash reel for attachment to the pilot's parachute harness, an anti-blackout device comprising a suit of mesh fabric woven on the bias and adapted to compress the torso and lower limbs of the pilot upon elongation of the fabric by the weight of the pilot acting against a secured upper end of the suit, releasable snap hook means on the upper end of said suit for attachment to the anti-crash reel, releasable snap hook means on the sides of said suit for attachment to the safety belt, and means on said suit for attaching said suit to the parachute harness.

2. In combination with safety apparatus in an aircraft including a plurality of body movement restraining means, an anti-blackout device comprising a suit of fabric woven on the bias and adapted to compress the torso and constrict the flow of blood to the lower limbs upon elongation of the fabric by the weight of the body acting against a secured upper end of the suit, a release hook on the upper end of the suit for attachment to one of the body movement restraining means, and release hooks on each side of the suit for attachment to other of the body movement restraining means.

3. An anti-blackout suit for use by aviators in aircraft having an anti-crash reel arranged to be attached to the shoulder harness of an aviator's suit or parachute harness for the purpose of restraining forward movement of the aviator's body during decelerations of two "G's" or more comprising a mesh fabric woven on the bias and having leg-encompassing portions and a back panel portion, said fabric bound on all edges by tapes, said leg-encompassing portions having coacting closure means on said taped edges arranged to meet along the inner leg seam to form inner-leg tapes, a pair of harness tapes extending from and secured to the inner-leg tapes of said leg-encompassing portions and criss-crossing through the crotch partially across the back to the hips having sewed thereon meeting edges of said leg-encompassing portions and said back panel portion, a second pair of harness tapes sewed to said inner-leg tapes and having the closure means of said taped edges of said leg encompassing portions continued thereon, said second pair of harness tapes arranged to meet said first pair across the groin, chest straps secured to said second pair of harness tapes, a pair of instep straps on the lower ends of said leg-encompassing portions, a pair of shoulder straps each secured at one end to the upper end of said back panel portion and engageable one each at the other end with said first pair of harness tapes, and means for securing the upper end of said back panel and said shoulder straps to the anti-crash reel whereby forward and/or downward relative movement of the aviator's body elongates said suit causing said mesh fabric to tighten and thereby constrict the flow of blood to the legs of the aviator.

ROBERT W. WILKINS.

REFERENCES CITED

The following references are of record in the file of this patent:

UNITED STATES PATENTS

| Number | Name | Date |
|---|---|---|
| 1,239,041 | Roe | Sept. 4, 1917 |
| 1,898,090 | Lethern | Feb. 21, 1933 |
| 2,104,758 | Poppen | Jan. 11, 1938 |
| 2,164,278 | Kellems | June 27, 1939 |
| 2,342,420 | Miner | Feb. 22, 1944 |
| 2,397,710 | Versoy et al. | Apr. 2, 1946 |
| 2,475,588 | Bierman | July 12, 1949 |

FOREIGN PATENTS

| Number | Country | Date |
|---|---|---|
| 219,980 | Great Britain | July 29, 1924 |
| 328,406 | Great Britain | May 1, 1930 |